United States Patent
Nyadong et al.

(10) Patent No.: US 12,546,760 B2
(45) Date of Patent: Feb. 10, 2026

(54) QUANTITATING CORROSIVE NAPHTHENIC ACIDS IN CRUDE OIL

(71) Applicant: PHILLIPS 66 COMPANY, Houston, TX (US)

(72) Inventors: Leonard Nyadong, Owasso, OK (US); Edward C. Weintrob, Edmond, OK (US)

(73) Assignee: Phillips 66 Company, Houston, TX (US)

( * ) Notice: Subject to any disclaimer, the term of this patent is extended or adjusted under 35 U.S.C. 154(b) by 266 days.

(21) Appl. No.: 18/356,036

(22) Filed: Jul. 20, 2023

(65) Prior Publication Data
US 2024/0036025 A1 Feb. 1, 2024

Related U.S. Application Data

(60) Provisional application No. 63/392,565, filed on Jul. 27, 2022.

(51) Int. Cl.
*C10G 29/04* (2006.01)
*G01N 33/28* (2006.01)
*H01J 49/16* (2006.01)

(52) U.S. Cl.
CPC ......... *G01N 33/2835* (2013.01); *C10G 29/04* (2013.01); *H01J 49/165* (2013.01); *C10G 2300/203* (2013.01)

(58) Field of Classification Search
CPC .. C10G 2300/203; C10G 29/04; C10G 75/02; H01J 49/0036; H01J 49/165; G01N 33/2835; G01N 33/2876
See application file for complete search history.

(56) References Cited

FOREIGN PATENT DOCUMENTS

| | | | | |
|---|---|---|---|---|
| CA | 2785580 A1 | * | 7/2011 | ............ B01J 27/049 |
| JP | 2005154757 A | * | 6/2005 | ................ C10L 1/14 |
| WO | WO-2005040313 A1 | * | 5/2005 | ................ C10G 7/10 |

OTHER PUBLICATIONS

CA-2785580-A1 Translation (Year: 2011).*
JP-2005154757-A Translation (Year: 2005).*
Omar Yepez, "On the Chemical Reaction Between Carboxylic Acids and Iron, Including the Special Case of Naphthenic Acid", ScienceDirect Fuel, Department of Engineering and Applied Sciences, 2007, pp. 1162-1168.
Kuangnan Qian, Kathleen E. Edwards, Gary J. Dechert, Stephen B. Jaffe, Larry A. Green, and William N. Olmstead, "Measurement of Total Acid Number (TAN) and TAN Boiling Point Distribution in Petroleum Products by Electrospray Ionization Mass Spectrometry", Anal. Chem. 2008, vol. 80, pp. 849-855.

(Continued)

*Primary Examiner* — Ellen M McAvoy
*Assistant Examiner* — Chantel Graham
(74) *Attorney, Agent, or Firm* — Phillips 66 Company (57) ABSTRACT

Processes for quantitating the corrosivity of naphthenic acids in a sample comprising crude oil or a liquid fraction thereof by reacting the sample with a metal comprising iron to produce iron naphthenates that are then stabilized by a ligand. The stabilized iron naphthenates are then analyzed by mass spectrometry to accurately quantitate the percentage of total naphthenic acids in the sample that are iron-reactive naphthenic acids associated with metal corrosion.

13 Claims, 5 Drawing Sheets

(56) References Cited

OTHER PUBLICATIONS

B.E. Smith and S.J. Rowland, "A Derivatisation and Liquid Chromatography/Electrospray Ionisation Multistage Mass Spectrometry Method for the Characterisation of Naphthenic Acids", Rapid Communications in Mass Spectrometry, Rapid Commun. Mass Spectrom., 2008, vol. 22, pp. 3909-3927.

\* cited by examiner

QUANTITATING CORROSIVE NAPHTHENIC ACIDS IN CRUDE OIL

CROSS-REFERENCE TO RELATED APPLICATIONS

This application is a non-provisional application that claims the benefit of and priority to U.S. Provisional Application Ser. No. 63/392,565 filed Jul. 27, 2022, titled "Quantitating Corrosive Naphthenic Acids in Crude Oil", which is hereby incorporated by reference in its entirety.

STATEMENT REGARDING FEDERALLY SPONSORED RESEARCH OR DEVELOPMENT

None.

FIELD OF THE INVENTION

The present invention relates to processes for quantitating the corrosion potential of naphthenic acids in a sample comprising crude oil or a liquid fraction thereof.

BACKGROUND

With the increase of energy demand and depletion of conventional crude oil resources, high acidity crude oil is becoming an important raw feedstock because of its abundance and relatively low price. High acid crudes (HACs) are those crude oils with a total acid number (TAN) of higher than 0.5 mg KOH/g, which is the measured amount of potassium hydroxide (in mg) required to neutralize one grain of oil.

Current accepted practice for assessing the potential corrosivity of a crude oil feedstock is to exclusively use measurements of the total acid number (TAN) and total sulfur content. However, the TAN often does not correlate well with the actual corrosivity of a given crude oil. Naphthenic acids (NAs) are responsible for much of the acidity of crude oil, but not all naphthenic acids are corrosive (defined herein as those naphthenic acids that react readily with iron). The corrosivity largely depends on the molecular structure of the acid. The subset of naphthenic acids that are corrosive cause serious high-temperature (i.e., 220-450° C.) corrosion of refinery equipment, transportation pipelines, and storage tanks that increases the operational costs of these systems.

What is needed are methods and systems that can provide more detailed insight regarding the percentage of total naphthenic acids in a crude oil feed stock that react with iron, and as a consequence, are corrosive to refinery equipment. Such knowledge would be useful for making better-informed purchasing decisions and more accurately predicting periodic maintenance intervals for refinery process equipment.

BRIEF SUMMARY OF THE DISCLOSURE

Some embodiments of the process comprise a process for quantitating iron-reactive naphthenic acids in liquid hydrocarbons, comprising: a) providing a sample of a feed stock that comprises liquid-phase hydrocarbons and naphthenic acids; b) mixing the sample with a metal or metal alloy comprising iron at a temperature that facilitates a reaction between carboxylic acid functional groups on at least a portion of the naphthenic acids and the iron to produce a modified sample comprising iron naphthenates; c) mixing the modified sample with a ligand to produce a stabilized modified sample comprising stabilized iron naphthenates; d) analyzing a portion of the stabilized modified sample by ionization mass spectrometry to produce a mass spectrum that distinguishes free naphthenic acids that are not bound to iron from iron-reactive naphthenic acids comprising stabilized iron naphthenates by mass-to-charge ratio; e) calculating from the mass spectrum the percentage of total naphthenic acids that are iron-reactive naphthenic acids; f) obtaining a total acid number for the sample, and multiplying the total acid number by the percentage of total naphthenic acids that are iron-reactive naphthenic acids to produce a corrected total acid number for the sample, wherein a value for the corrected total acid number that meets or exceeds an predetermined action threshold value results in a least one of: 1) mixing the feed stock with a second feed stock that comprises a TAN or corrected TAN that is below the action threshold value, wherein the feed stock is mixed with the second feed stock at a ratio that is sufficient to decrease the corrected total acid number of the mixture to less than the action threshold value and produce a decreased acidity feed stock that is upgraded in a commercial refinery to produce at least one transportation fuel, wherein the second feed stock; 2) adding a chemical additive to the feed stock to produce a treated feed stock that is upgraded in a commercial refinery to produce at least one transportation fuel, wherein the treated feed stock comprises a concentration of the additive that is sufficient to prevent the corrosion of metal surfaces in the commercial refinery that are contacted with the treated feed stock; 3) rejecting the feed stock for upgrading in a commercial refinery and selecting an alternative feed stock for upgrading in a commercial refinery to produce at least one transportation fuel, wherein the alternative feed stock comprises a corrected total acid number that is less than the action threshold value; 4) catalytically transforming the feed stock in a manner sufficient to decrease the quantity of corrosive naphthenic acids in the feed stock and decrease the corrected total acid number to less than the action threshold value and produce a de-acidified feed stock that is upgraded in a commercial refinery to produce at least one transportation fuel; 5) purchasing the feed stock at a price that is discounted relative to a current market price for an alternative feed stock that comprises a corrected total acid number that is less than the action threshold value, and upgrading the feed stock in a commercial refinery to produce at least one transportation fuel, wherein the corrected TAN value is utilized to schedule a rate of periodic maintenance for the commercial refinery.

In some embodiments, naphthenic acids that do not form a complex with iron comprise a molecular mass-to-charge ratio on a mass spectrum that is in the range from 150 to 370, wherein iron-reactive naphthenic acids that form a complex with iron comprise a mass to charge ratio on a mass spectrum that exceeds 370.

In some embodiments, the ionization mass spectrometry is electrospray ionization mass spectrometry. In some embodiments, the electrospray ionization mass spectrometry is conducted in negative ion mode. In some embodiments, the electrospray ionization mass spectrometry comprises a skimmer and a detector and the direct current offset voltage between the skimmer and the detector is maintained at a voltage sufficient to dissociate any naphthenic acid multimers and prevent detection of naphthenic acid multimers on the mass spectrum.

In some embodiments, the total acid number is measured by base titration method equivalent to ASTM D664.

In some embodiments, the ligand is any ligand sufficient to stabilize the iron naphthenate complex for analysis by mass spectrometry. In some embodiments, the ligand is a monodentate ligand selected from chloride ion, bromide ion, fluoride ion, amide ion, cyanide ion, thiocyanate ion, pyridine and bipyridine.

In some embodiments, the action threshold value of the corrected total acid number is in the range from 0.01 mg/g to 5.0 mg/g. In some embodiments, the action threshold value of the corrected total acid number is in the range from 0.1 mg/g to 1.0 mg/g. In some embodiments, the action threshold value of the corrected total acid number is 1.0 mg/g.

In some embodiments, the chemical additive to the feed stock comprises at least one of a thiophosphate ester additive and a phosphate ester additive.

In some embodiments, the catalytic transforming of the feed stock comprises at least one of catalytic decarboxylation, catalytic hydrogenation, catalytic esterification, oxidation, thermal decomposition, alkaline neutralization, adsorption, solvent extraction, ionic liquid extraction, membrane filtration, coagulation and/or flocculation and biodegradation.

BRIEF DESCRIPTION OF THE DRAWINGS

A more complete understanding of the present invention and benefits thereof may be acquired by referring to the follow description taken in conjunction with the accompanying drawings in which.

The inventive processes and systems may comprise various modifications and alternative forms, only some of which are illustrated in the drawings. The drawings may not be to scale.

DETAILED DESCRIPTION

Historically, the term 'naphthenic acid' was used in the petroleum refining industry to describe carboxylic acids with one or more saturated aliphatic rings. Later development of powerful analytical methods and techniques revealed the enormous variety of acidic compounds present in crude oil and other petroleum products. Thus, today the term 'naphthenic acid' is a collective term used to describe the higher molecular weight carboxylic acids present in crude oil, including all aromatic, cyclic, and acyclic carboxylic acids.

These acids can cause significant corrosion to refinery equipment at high temperatures, typically at temperatures in the range from 220° C. to 400° C. and are the largest contributor to the total acid number (TAN) of a crude oil. Naphthenic acid corrosion occurs by the liquid phase reaction of the acid (HA) with iron from metal process vessels and piping to form an oil-soluble iron carboxylate ($FeA_2$) and hydrogen gas ($H_2$), as shown in the following reaction:

$$2HA + Fe \rightarrow FeA_2 + H_2$$

The TAN of a crude oil or crude fraction is widely used in the refining industry to assess the risk of corrosion from refining a particular crude oil or crude oil fraction. TAN is a measurement of acidity that is defined as the amount of potassium hydroxide (KOH) in milligrams needed to neutralize the acid in one gram of oil. Unfortunately, while a value for TAN is easily measured, it often does not accurately reflect the true corrosive potential of a crude oil or crude fraction in a petroleum refinery. The reason for this is that while naphthenic acids (NAs) are present in crude oil and comprise a large majority of the acidic compounds in crude oil, only a subset of these NAs are corrosive to refinery equipment.

The ability to more accurately quantitate the corrosivity of a given crude oil sample would provide several benefits, including better informing crude oil purchasing decisions for commercial petroleum refineries. Crudes oil cargos with high TAN are discounted in price because of their acidity and these discounts begin with a TAN as low as 0.1 mg/g. However, in certain instances a high TAN crude oil may be less corrosive than indicated by its TAN value if a high percentage of naphthenic acids in that crude oil are non-corrosive (i.e., don't readily react with iron). Thus, a more accurate method to determine crude oil corrosivity may facilitate the prediction of pipeline and refinery equipment corrosion rate, and in turn, more accurate prediction of required equipment maintenance intervals. Alternatively, more accurate quantitation of crude oil corrosivity may also facilitate mitigative measures taken to decrease the corrosive effects of naphthenic acids.

The present disclosure presents a novel approach for determining the percentage of naphthenic acids in a crude oil sample that are corrosive to metal by direct structural identification of the molecular complexes that result when these acids are reacted with iron in solution and the resulting iron naphthenate is stabilized for analysis by mass spectrometry using a ligand. More specifically, the approach involves the direct quantitation of stabilized iron naphthenate corrosion products that are formed following reaction of corrosive naphthenic acids with iron. In this approach, a ligand is used to stabilize the iron naphthenate complex to facilitate direct analysis of the intact complex by mass spectrometry.

The process generally comprises providing a sample of a feed stock that comprises liquid-phase hydrocarbons and includes naphthenic acids. The sample is placed in contact with a solid metal coupon comprising iron or a fine powder comprising to facilitate a chemical reaction between carboxylic acid functional groups on at least a portion of the naphthenic acids and the iron. The portion of naphthenic acids that chemically react with the iron to form iron naphthenates (soluble in the sample) are typically those that are known to be corrosive to metal that is used in commercial refinery processes and systems. Formation of iron naphthenates produces a modified sample.

A direct approach for determining the corrosive naphthenic acids would be to detect the intact iron naphthenates complex by mass spectrometry. However, this complex is very labile and there is no approach in literature for detecting this intact complex in a mixture with other acids. The present process introduces a novel approach for detecting the bound naphthenic acid-iron complex directly by introduction of a ligand to stabilize the complex, which allows analysis and detection by electrospray ionization mass spectrometry.

Addition of a ligand to a sample containing iron naphthenates produces a stabilized modified sample comprising stabilized iron naphthenates. A portion of the stabilized modified sample is then analyzed by mass spectrometry to produce a mass spectrum that distinguishes corrosive from non-corrosive naphthenic acids by mass to charge ratio, wherein non-corrosive naphthenic acids that do not form a complex with iron comprise a molecular mass-to-charge (m/z) ratio on the mass spectrum that is less that the m/z ratio of corrosive naphthenic acids that form a complex with iron.

In some embodiments, non-corrosive naphthenic acids are observed on the mass spectrum at a m/z ratio that is in the range from 150 to 370, and corrosive naphthenic acids (in the form of stabilized iron naphthenates) are observed on the mass spectrum at a m/z ratio that exceeds 370 and is dependent upon the ligand utilized to stabilize the iron naphthenates. In some embodiments, non-corrosive naphthenic acids are observed on the mass spectrum at a m/z ratio that is in the range from 150 to 370, and corrosive naphthenic acids (in the form of stabilized iron naphthenates complexed with chloride ligand) are observed on the mass spectrum at a m/z ratio that is in the range from 370.1 to 520. In some embodiments, non-corrosive naphthenic acids are observed on the mass spectrum at a m/z ratio that is in the range from 150 to 360, and corrosive naphthenic acids (in the form of stabilized iron naphthenates complexed with chloride ligand) are observed on the mass spectrum at a m/z ratio that is in the range from 360 to 520.

Speaking generally, the fraction of total naphthenic acids that are corrosive naphthenic acids is obtained by first integrating the total mass spectrum signals in a range of m/z ratios that are associated with: 1) corrosive naphthenic acids (i.e., stabilized iron naphthenates) and 2) non-corrosive naphthenic acids that are not associated with iron. The fraction of corrosive naphthenic acids is then calculated then dividing the total mass spectrum signal associated with the corrosive naphthenic acids by the total mass spectral signal for both corrosive and non-corrosive naphthenic acids.

A conventional TAN value is next calculated for the sample using conventional methods. The fraction of corrosive naphthenic acids (as determined by the present process) is multiplied by the conventional TAN value to produce a corrected TAN value for the sample. Like the conventional TAN value, the corrected TAN value is given in units of the mg KOH required to neutralize the pH of 1 g of feed stock sample. However, the corrected TAN value as calculated by the present process can be more directly correlated to the actual corrosivity of a given feed stock. Generally, the corrected TAN is in the range from 0.00 mg/g to 10.0 mg/g. In some embodiments, the corrected TAN is in the range from 0.05 mg/g to 2.0 mg/g. In some embodiments, the corrected TAN is in the range from 0.05 mg/g to 1.0 mg/g.

When the value for the corrected TAN meets or exceeds a designated action threshold value, a response is triggered that comprises at least one action to prevent (or minimize) corrosion to refinery process equipment and piping caused by the feed stock.

When the corrected TAN value meets or exceeds the action threshold value, it triggers an response that comprises at least one of: a) mixing the feed stock with a quantity of a second feed stock (comprising a TAN or corrected TAN that is below the action threshold value) that is sufficient to decrease the corrected TAN to less than the action threshold value and produce a decreased corrosivity feed stock that is upgraded in a commercial refinery to produce at least one transportation fuel; b) adding a chemical additive to the feed stock to decrease the corrected total acid number to a value that is less than the action threshold value and produces a decreased corrosivity feed stock that is upgraded in a commercial refinery to produce at least one transportation fuel; c) rejecting the feed stock comprising a corrected TAN that exceeds the action threshold value and selecting an alternative feed stock for upgrading in a commercial refinery to produce at least one transportation fuel; d) catalytically transforming the feed stock in a manner that is sufficient to decrease the quantity of corrosive naphthenic acids in the feed stock and decrease the corrected TAN to less than the action threshold value and produce a de-acidified feed stock that is upgraded in a commercial refinery to produce at least one transportation fuel.

In certain embodiments, one or more of calculating the corrected TAN, comparing the corrected TAN to a designated action threshold value that when exceeded indicates a corrosive feed stock, and initiating a response (selected from one of the options listed above) may be performed by an automated process controller that comprises programming consisting of an algorithm for calculating the corrected TAN and initiating a response if the corrected TAN exceeds the action threshold value. The automated process controller may be located at any location that allows access to the feed stock or a sample thereof. The automated process controller may calculate the corrected TAN for a feed stock at any point that allows a decision to be made regarding the corrosiveness of the feed stock prior to it being upgraded in a commercial refinery to produce at least one transportation fuel. In some embodiments, a sample of a given feed stock may be tested prior to purchase of the feed stock to inform purchasing decisions and potential offer price.

In addition to more accurately quantitating the corrosivity of crude oil feed stocks, certain embodiments of the process may apply the process disclosed herein to quantitate the corrosivity of naphthenic acids in liquids that are associated with production of hydrocarbon fuels from either petroleum or biomass, including refining process water, oil extraction process water, pyrolysis oil, oil purchasing decisions (and offer price) and estimating process equipment corrosion rate.

Following stabilization of the iron naphthenates with a suitable ligand, a portion of the sample is analyzed by mass spectrometry. Various mass spectrometry ionization techniques can be used with the present method that are well understood by one having experience in the technology, including, but not limited to, atmospheric pressure photoionization, atmospheric pressure chemical ionization, plasma and glow discharge ionization, electron impact ionization, field ionization, fast atom bombardment ionization, laser ionization, matrix-assisted laser desorption ionization, plasma desorption ionization, secondary ionization, thermal ionization, spark source ionization, thermospray ionization, electrospray ionization, etc.

In some embodiments, electrospray ionization (ESI) mass spectrometry is utilized. Preferably, ESI mass spectrometry is conducted in in negative-ion mode, which offers a selective and effective approach for characterizing naphthenic acids from petroleum and distillates fractions, without the need for sample prefractionation. Naphthenic acids have the lowest pKas (acid dissociation constants) of the organic species in petroleum, and as such, they readily undergo deprotonation in a protic solvent such as a petroleum-derived fraction. Negative-ion ESI simply serves as a means for transferring the naphthenic acid ions from solution into gas phase for mass spectrometry analysis.

Figure 1:
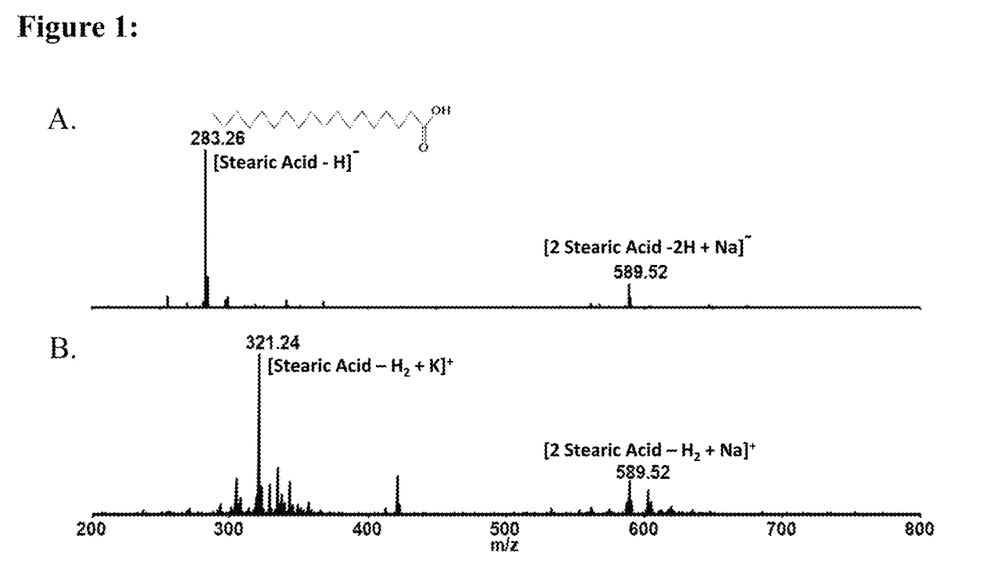
FIG. 1 is an electrospray ionization mass spectrum of neat iron stearate standard with no ligand added in negative-ion mode (top spectrum), and positive-ion mode (bottom spectrum).

Following formation of iron naphthenate complexes, a wide variety of ligands can be used to generate a stabilized coordination complex between iron and the carboxylic acid group of naphthenic acids (i.e., iron naphthenates) that facilitates mass spectrometry analysis. The need for such a ligand to stabilize the iron naphthenates is evidenced by the mass spectra shown in FIG. 1. A negative electrospray ionization mass spectrum (FIG. 1A.) and the positive electrospray ionization mass spectrum (FIG. 1B.) are shown for a sample containing iron stearate (i.e., stearic acid complexed with iron) in the absence of a stabilizing ligand. In both negative and positive ion mode, the resulting mass spectra show only peaks corresponding to the free stearic acid species with no iron bound species detected. This strongly suggests that iron-naphthenate complexes are insufficiently stable to be detected by mass spectrometry analysis without first being stabilized by use of a ligand.

The ligand utilized with the present process can be any ligand that is capable of forming a stabilized iron naphthenate complex for a quantity of time that is sufficient to allow analysis of the iron naphthenate complex by mass spectrometry. The ligand utilized is an element or molecule that binds to the iron atom of an iron naphthenate to form a stable coordination entity or complex. Ligands are generally classified according to their quantity of binding sites with the metal atom at the center of the complex, their charge and size. Exhaustively identifying the broad range of ligands that can be used with the present process is unnecessary and beyond the scope of the present disclosure as the use of such ligands is familiar to those having experience in the field. However, a few examples of monodentate ligand (i.e., a ligand that binds to the metal ion via a single bond) that may be useful with the present process includes negative ions such as $Br^-$, $F^-$, $Cl^-$, $I^-$, amide, cyanide and thiocyanate. A few examples of bidentate ligand (i.e., a ligand that binds to the metal ion via two different atoms) that may be useful with the present process includes ethylenediamine, acetylacetonate, phenylanthroline, oxylate etc. Tridentate and polydentate ligands may also be used.

Figure 2:
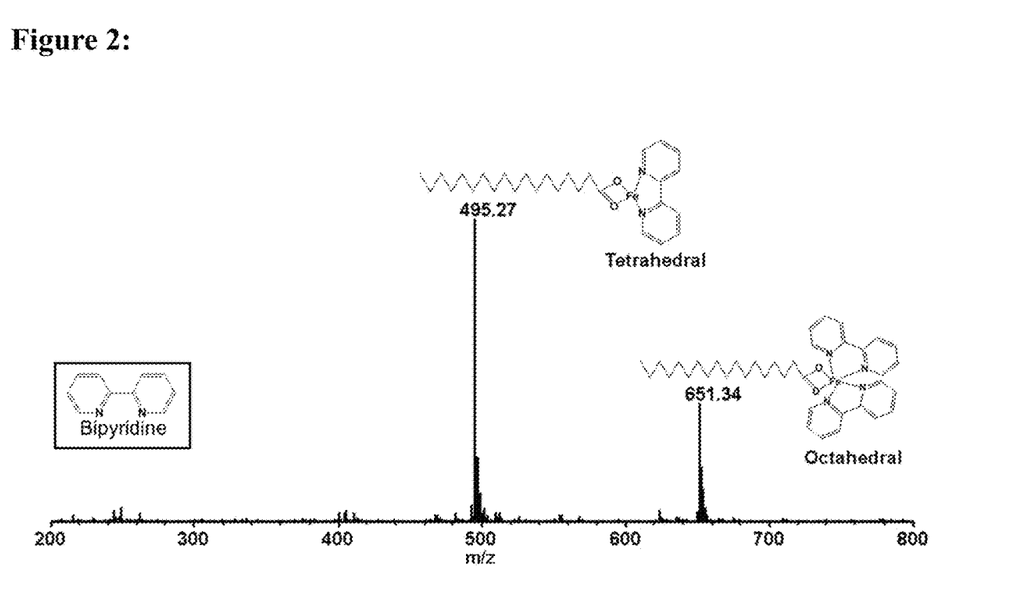
FIG. 2 is a positive-ion electrospray ionization mass spectrum of iron stearate standard with bipyridine ligand.
Figure 3:
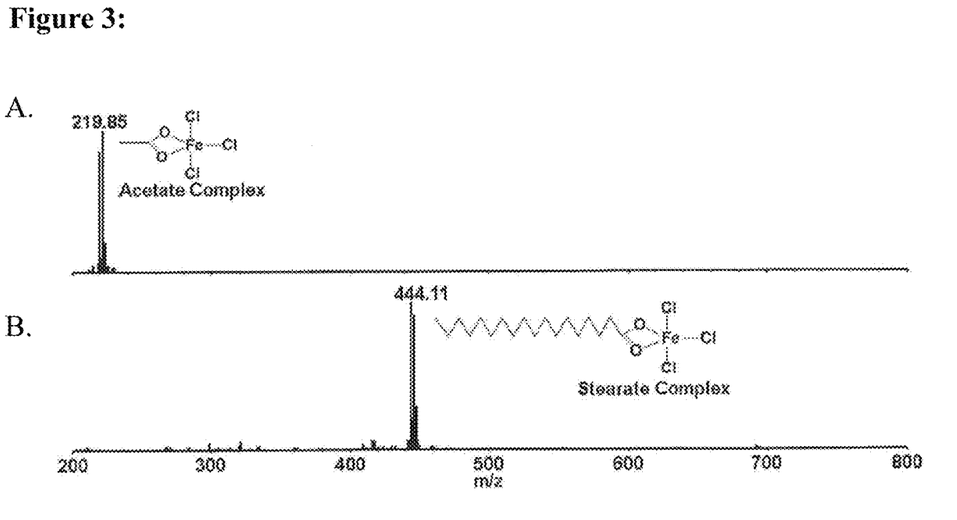
FIG. 3 is a negative-ion electrospray ionization mass spectrum of iron acetate (top spectrum) and iron stearate standard (bottom spectrum) with chloride.

In testing potential ligands useful with the process disclosed herein, bipyridine was tested as a ligand to stabilize iron naphthenates. FIG. 2 shows a positive-ion electrospray ionization mass spectrum of an iron stearate standard complexed with bipyridine (chemical structure shown at left). The spectrum shows both a tetrahedral complex (m/z=495.27) and an octahedral complex (m/z=495.27) of the iron naphthenate with bipyridine. Clearly, FIG. 2 demonstrates that the use of a ligand that produces multiple iron naphthenate complexes on a mass spectrum can make interpretation (and integration) of the mass spectrum more complex and increase the probability of m/z signal overlap. Chloride ion was also explored as a ligand useful with the process disclosed herein. FIG. 3 shows a negative-ion electrospray ionization mass spectrum of two iron naphthenates stabilized with chloride ion (added to the solution in the form of ammonium chloride). Iron acetate (FIG. 3A.) and iron stearate (FIG. 3B.) standards produce only a single tetrahedral complex on the mass spectrum for each complex when bound to chloride ligand, resulting in a mass spectrum that can be easily quantitated. Further, in instances where two dissimilar naphthenic acids are bound to a single iron ion, addition of a ligand serves to displace the acid molecule from the iron that is less corrosive (and thus, more weakly bound to the iron). This serves as an additional advantage of the process, in that addition of ligand stabilizes only the most corrosive iron naphthenate complexes.

Defining the Corrosion Potential of a Given Feed

When the value for corrected TAN (i.e., corrosion potential) of a feed stock sample exceeds a designated action threshold value, one or more actions may be taken to: decrease the corrosive potential of the feed stock, mitigate or prevent corrosion of equipment utilized to process and/or refine the feed stock, and/or inform the scheduling of periodic maintenance for equipment that is utilized to convert (or refine) the feed stock to products that include, but are not limited to, liquid transportation fuels.

In some embodiments, the action threshold value for the corrected TAN is in the range from 0.01 mg/g to 10.0 mg/g. In some embodiments, the action threshold value for the corrected TAN is in the range from 0.05 mg/g to 1.0 mg/g. In some embodiments, the action threshold value for the corrected TAN is in the range from 0.1 mg/g to 0.5 mg/g. In some embodiments, the action threshold value for the corrected TAN is 1.0 mg/ml.

Action/Mitigation in Response to a Corrected TAN Above a Threshold Value

As stated above, when the value for corrected TAN meets or exceeds the action threshold value comprises one or more of the following: 1) dilution of the corrosive feed stock with a sufficient volume of a non-corrosive feed stock to decrease the overall corrosive potential of the mixed feed stock; 2) neutralization with sufficient base (optionally in combination with a surfactant) to produce a partially neutralized feed stock comprising a corrected TAN that is less than the action threshold value. 3) upgrading process piping/vessels that contact the feed stock to corrosion resistant metal alloys (e.g., alloys comprising Cr, Mo added to stainless steel); 4) process control (e.g. decreasing temperature and/or flow rate, changing from liquid to vapor) to decrease rate of corrosion caused by the feed stock; 5) catalytic esterification or decarboxylation, supercritical fluids (methanol) and ionic liquids; 6) rejecting the feed stock rejecting the feed stock for upgrading in a commercial refinery and selecting an alternative feed stock for upgrading in a commercial refinery to produce at least one transportation fuel, where the alternative feed stock comprises a corrected total acid number that is less than the action threshold value.

In some embodiments the response to a corrected TAN that meets or exceeds the action threshold value comprises mixing the feed stock with a quantity of a second feed stock that has a lower corrected TAN (i.e., corrosive potential) in an amount that is sufficient to produce a decreased corrosivity feed stock comprising a corrected TAN that is less than the action threshold value.

In some embodiments, the response to a corrected TAN that meets or exceeds the action threshold value comprises mixing the feed stock with a basic pH solution. Commonly utilized basic solutions include (but are not limited to) sodium hydroxide, potassium hydroxide and/or calcium hydroxide. The basic pH solution is added in an amount sufficient to neutralize the acidity and/or corrosivity of at a least a portion of the naphthenic acids in the feed stock and decrease the corrected TAN of the feed stock to a value that is less than the action threshold value.

Surfactants are molecules composed of an oil-soluble group and a water-soluble group. These chemicals lower the interfacial tension between the immiscible fluids. Surfactants are classified into four major groups depending on the nature of the water-soluble part of the molecule. These divisions are anionic, cationic, non-ionic and amphoteric. In some embodiments, surfactants may be employed together with a basic pH solution to prevent emulsion formation when bases are utilized to neutralize naphthenic acids. In some embodiments, oil dispersible basic reagents (over-based detergents), such as, but not limited to, calcium sulfonate and calcium phenate may be mixed with the feed stock to decrease the acidity and the corrosiveness of the feed stock. In some embodiments the surfactants may be at least one of quaternary ammonium compounds, quaternary phosphonium compounds. The additives may comprise linear molecules having at least two carboxylic acid or acrylic acid functional moieties. In some embodiments, the response to a corrected TAN that meets or exceeds the action threshold value comprises addition of a corrosion inhibitor to the feed stock in an amount that protects refinery process equipment contacted by the feed stock, rather than by directly neutralizing naphthenic acids. A corrosion inhibitor can be described as a chemical additive that causes a lowering in the corrosion rate of the target metallic substrate, without causing a significant change to the corrosive medium into which the inhibitor is dispensed. Corrosion inhibitors are generally cationic molecules that adsorb onto metal surfaces to form a protective barrier that protects iron in the metal from exposure to corrosive acids.

Organic corrosion inhibitors include compounds containing nitrogen, sulfur, oxygen, etc. heteroatoms, which undergo efficient adsorption onto metallic substrates. Generally, five or six membered heterocycles have been observed to work as effective corrosion inhibitors, for example (but not limited to) imidazoles, oxadiazoles, thiazoles triazoles, pyridines, pyrimidines, triazines, and their benzene fused analogues such as the benzimidazole, benzotriazole etc. In addition, long chain fatty acid hydrazides and substituted thiosemicarbazides. Inorganic corrosion inhibitors may also be utilized, including salts of zinc, copper, nickel, arsenic, and additional metals. However, use of these inhibitors is not preferred to environmental concerns. There are undoubtedly other corrosion inhibitors that would be familiar to one having expertise in the art that would be useful with the process disclosed herein.

In some embodiments, the action taken in response to a feed stock comprising a corrected TAN value that meets or exceeds the action threshold value comprises wherein the catalytic transforming of the feed stock comprises at least one of catalytic decarboxylation, catalytic hydrogenation, catalytic esterification, oxidation, thermal decomposition, alkaline neutralization, adsorption, solvent extraction, ionic liquid extraction, membrane filtration, coagulation and/or flocculation and biodegradation. Such methodologies are well-understood and therefore do not require further elaboration here.

In some embodiments, the action taken in response to a feed stock comprising a corrected TAN value that meets or exceeds the action threshold value comprises rejecting the feed stock for upgrading in a commercial refinery and selecting an alternative feed stock for upgrading in a commercial refinery to produce at least one transportation fuel, wherein the alternative feed stock comprises a corrected TAN value that is less than the action threshold value.

In some embodiments, the action taken in response to a feed stock comprising a corrected TAN value that meets or exceeds the action threshold value comprises purchasing the feed stock at a price that is less than the originally proposed price.

EXAMPLES

The following non-limiting examples are provided to better illustrate the process described herein. The examples do not demonstrate every contemplated embodiment. The materials described and the amounts thereof, as well as other process conditions and details recited in these examples are not intended to limit the scope of the process to less than what is claimed.

Example 1

In a first example, duplicate coupons of C1010 carbon steel were subjected to corrosion by a kerosene sample that contained naphthenic acids. Each steel coupon was contacted with a sample of the kerosene at 525° F. and 450 psig for 72 hr under an inert nitrogen atmosphere. Kerosene was replenished at a rate of 30 ml/hr. analysis of a sample of the kerosene for the presence of iron naphthenates. Corrosion rates for each coupon of steel were determined by conventional methods, utilizing the initial and final coupon weights, metal density, coupon surface area, and time elapsed.

In addition, to an aliquot of each autoclaved kerosene sample chloride ion was added as a ligand to stabilize any iron naphthenates (resulting from corrosion of the steel coupons) present in the autoclaved kerosene sample. A solution of the autoclave kerosene sample was prepared at a concentration of 100 μg/mL in 50:50 toluene/methanol. Chloride ion solution (prepared in methanol) was added to reach a final chloride ion concentration of 10 ug/ml (at room temperature) and the resulting stabilized autoclaved kerosene sample was analyzed by mass spectrometry within 1 min or less.

The stabilized autoclaved kerosene sample was infused into a heated electrospray ionization source (Thermo Scientific™, San Jose, California) at a flow rate of 20 μL/min for generation of ions. The electrospray voltage was set to ±5 kV for generation of negative and positive ions respectively. The generated ions were sampled into the inlet of a high-resolution mass spectrometer (Thermo Scientific, San Jose California) for measurement of their mass-to-charge ratio (m/z). The HESI probe temperature and voltage were set at 40° C., and 5 kV, respectively. The nitrogen sheath gas, auxiliary and sweep gas flow rates were 30, 5 and 0 a.u. (arbitrary units), respectively. The mass spectrometer inlet capillary temperature was set to 300° C. The S lens RF level was set at 60%. Mass analysis was performed with a hybrid linear ion trap orbitrap (Orbitrap Elite, Thermo Scientific, San Jose California) mass spectrometer. The ion trap mass analyzer was operated with automatic gain control (AGC) set at 30,000 ions and the AGC target for the orbitrap mass analyzer was set at 1,000,000, with a maximum injection time of 100 ms. Mass analysis was performed in the Orbitrap™ mass analyzer at a resolving power of 120,000. For analysis on a linear quadrupole ion trap mass spectrometer, the multipole DC offset voltage was set to 30V. Full scan MS spectral data were acquired with Xcalibur version 2.2.0 software.

Quantitation of free naphthenic acids versus those bound with iron (iron naphthenates) was done by application of experimentally determined response factors to correct for naphthenic acid chain length dependence and mass spectrometer response discrepancies. A linear calibration function (based on mass spectrometry analysis of an equimolar mixture of C8 to C24 fatty acids) was applied to correct for the lower ion transmission responses of naphthenic acid species below m/z 220 (equivalent to about C14 hydrocarbon) to assure accurate quantitation of smaller molecular weight naphthenic acid species. Known quantities of $^{13}$C-labelled internal standards (e.g., myristic acid-1-$^{13}$C) were utilized to generate internal standard peaks that did not interfere with the C8-C24 naphthenic acid peaks.

Figure 4:
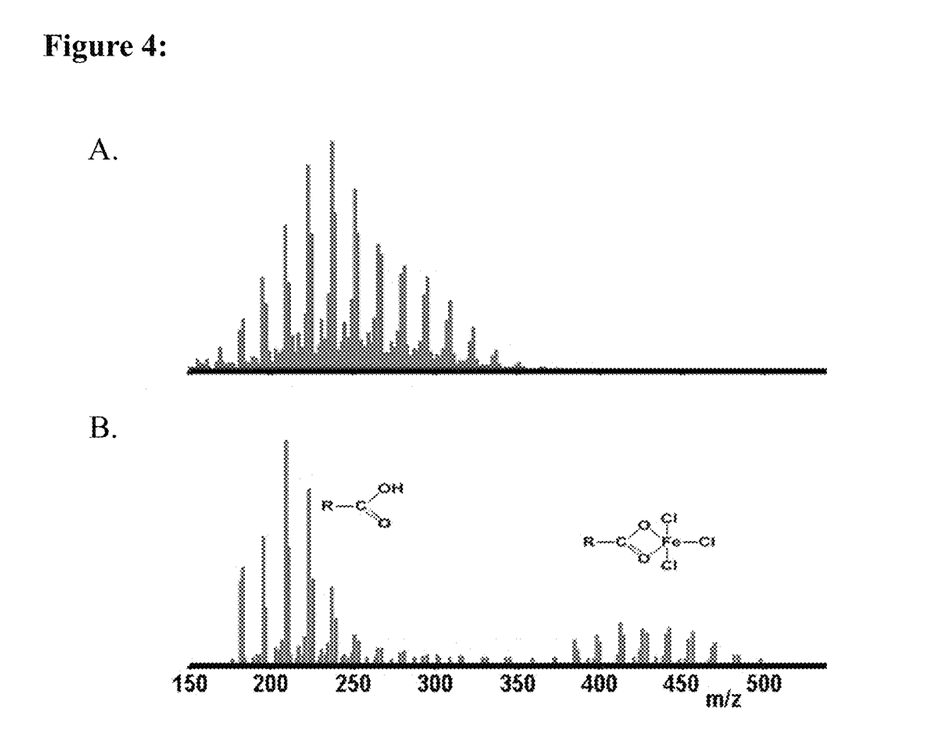
FIG. 4 is negative-ion electrospray ionization mass spectrum of a kerosene feed stock (top spectrum) and corrosion reaction products (bottom spectrum) following autoclaving of the kerosene in contact with iron, and in the presence of chloride ions.

FIG. 4A shows a mass spectrum of a portion of an unreacted kerosene sample and FIG. 4B shows a mass spectrum of the sample following the kerosene sample reacted with a steel coupon at high pressure and temperature where any iron naphthenates formed were stabilized by chloride ion acting as ligand. The mass spectrum for the unreacted kerosene sample is dominated by free unreacted acids seen in the range of m/z values from 160 to 370. However, mass spectrometry of a sample reacted with steel shows the presence of iron naphthenate-chloride complexes in the m/z range larger than 370 (alternatively in the range from 370.1 to 520) that correspond to the most iron-reactive (i.e., corrosive) naphthenic acids in the sample.

Example 2

A second example demonstrates the value of increasing multipole direct current (DC) offset voltage in the mass spectrometer to eliminate detection of naphthenic acid multimers in the mass spectrum. The results show that clearly distinguishing free naphthenic acids from iron naphthanate complexes via mass spectrometry is facilitated by a multipole direct current (DC) offset voltage that disassociates any naphthenic acid multimers.

One way to control multimers formation in negative ESI with the linear quadrupole ion trap mass spectrometer is by performing ion source collision-induced dissociation (CID) in the multipole region of the instrument. As ions pass through the skimmer into the mass spectrometer ion optics, they are accelerated by the potential difference between the skimmer (which is at ground potential) and the first multipole. Raising the multipole direct current (DC) offset voltage imparts kinetic energy to the ions which undergo collisions with gas molecules in the ion optics region. Those collisions result in the dissociation of labile noncovalent interactions to generate monomeric species, simplifying the mass spectrum.

Figure 5:
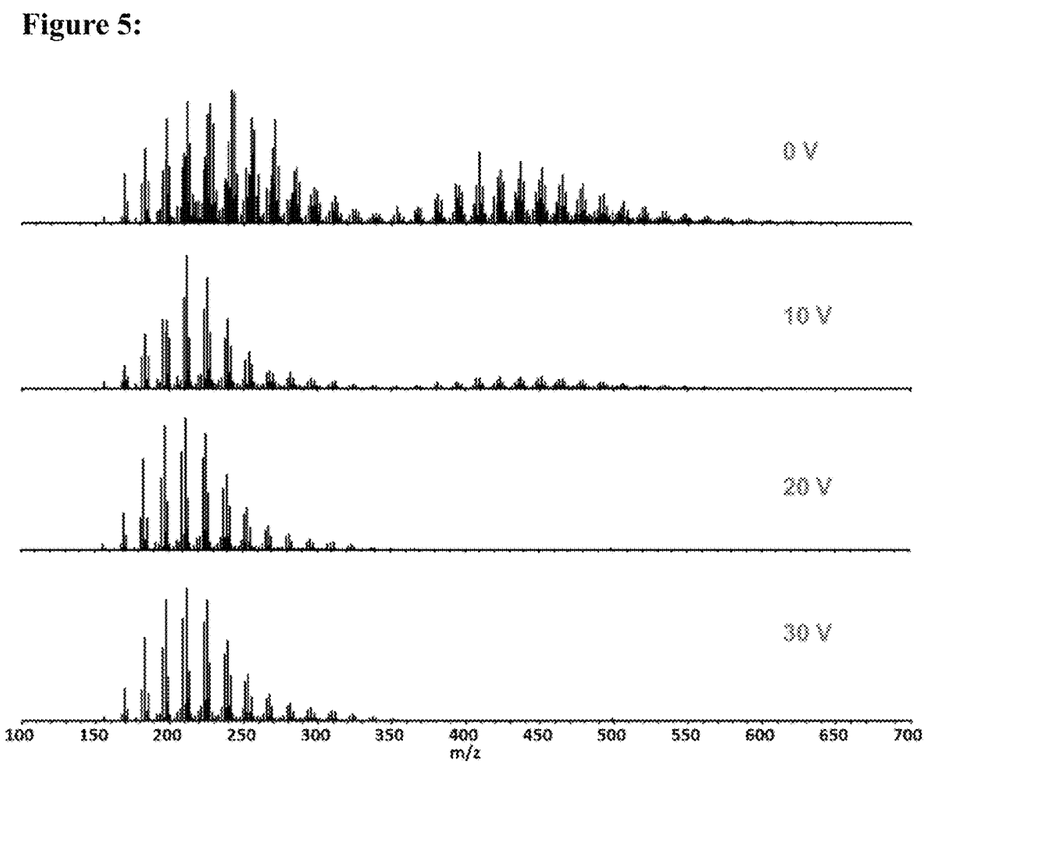
FIG. 5 Negative-ion ESI mass spectra from analysis of a Merichem naphthenic acid standard mixture at various source voltages.

FIG. 5 shows that progressively increasing the multipole DC offset voltage for analysis of naphthenic acids is essential to preventing dimers from appearing on the mass spectrum. This is important to assure minimal overlap on the mass spectrum between free naphthenic acids and iron naphthenate complexes. A standard naphthenic acid mixture was obtained (Merichem®, Houston, TX) and analyzed by mass spectrometry according to the methods described previously. At a multipole DC offset voltage of 0 V, an abundant distribution of peaks corresponding to naphthenic acid dimers was observed. The relative abundance of those species decreased as the voltage was increased to 10 V. At 30 V the dimer species completely disappeared, resulting in a mass spectrum where the ion current corresponding to each naphthenic acid was represented by just one peak, thereby facilitating quantitative analysis.

The descriptions of the various aspects of the present disclosure have been presented for purposes of illustration but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure can be devised without departing from the basic scope thereof.

We claim:

1. A process for quantitating iron-reactive naphthenic acids in liquid hydrocarbons, comprising:
   (a) providing a sample of a feed stock that comprises liquid-phase hydrocarbons and naphthenic acids;
   (b) mixing the sample with a metal or metal alloy comprising iron at a temperature that facilitates a reaction between carboxylic acid functional groups on at least a portion of the naphthenic acids and the iron to produce a modified sample comprising iron naphthenates;
   (c) mixing the modified sample with a ligand to produce a stabilized modified sample comprising stabilized iron naphthenates;
   (d) analyzing a portion of the stabilized modified sample by ionization mass spectrometry to produce a mass spectrum that distinguishes free naphthenic acids that are not bound to iron from iron-reactive naphthenic acids comprising stabilized iron naphthenates by mass-to-charge ratio;
   (e) calculating from the mass spectrum the percentage of total naphthenic acids that are iron-reactive naphthenic acids;
   (f) obtaining a total acid number for the sample, and multiplying the total acid number by the percentage of total naphthenic acids that are iron-reactive naphthenic acids to produce a corrected total acid number for the sample, wherein a value for the corrected total acid number that meets or exceeds an predetermined action threshold value results in a least one of:
      1) mixing the feed stock with a second feed stock that comprises a TAN or corrected TAN that is below the action threshold value, wherein the feed stock is mixed with the second feed stock at a ratio that is sufficient to decrease the corrected total acid number of the mixture to less than the action threshold value and produce a decreased acidity feed stock that is upgraded in a commercial refinery to produce at least one transportation fuel, wherein the second feed stock;
      2) adding a chemical additive to the feed stock to produce a treated feed stock that is upgraded in a commercial refinery to produce at least one transportation fuel, wherein the treated feed stock comprises a concentration of the additive that is sufficient to prevent the corrosion of metal surfaces in the commercial refinery that are contacted with the treated feed stock;
      3) rejecting the feed stock for upgrading in a commercial refinery and selecting an alternative feed stock for upgrading in a commercial refinery to produce at least one transportation fuel, wherein the alternative feed stock comprises a corrected total acid number that is less than the action threshold value;
      4) catalytically transforming the feed stock in a manner sufficient to decrease the quantity of corrosive naphthenic acids in the feed stock and decrease the corrected total acid number to less than the action threshold value and produce a de-acidified feed stock that is upgraded in a commercial refinery to produce at least one transportation fuel;
      5) purchasing the feed stock at a price that is discounted relative to a current market price for an alternative feed stock that comprises a corrected total acid number that is less than the action threshold value, and upgrading the feed stock in a commercial refinery to produce at least one transportation fuel, wherein the corrected TAN value is utilized to schedule a rate of periodic maintenance for the commercial refinery.

2. The process of claim 1, wherein naphthenic acids that do not form a complex with iron during the mixing of part b) comprise a molecular mass-to-charge ratio that is in the range from 150 to 370, wherein iron-reactive naphthenic acids that form a complex with iron comprise a mass to charge ratio on the mass spectrum that exceeds 370.

3. The process of claim 1, wherein the ionization mass spectrometry is electrospray ionization mass spectrometry.

4. The process of claim 3, wherein the electrospray ionization mass spectrometry is conducted in negative ion mode.

5. The process of claim 4, wherein the electrospray ionization mass spectrometry comprises a skimmer and a detector and the direct current offset voltage between the skimmer and the detector is maintained at a voltage sufficient to dissociate any naphthenic acid multimers and prevent detection of naphthenic acid multimers on the mass spectrum.

6. The process of claim 1, wherein the total acid number is measured by base titration method equivalent to ASTM D664.

7. The process of claim 1, wherein the ligand is any ligand sufficient to stabilize the iron naphthenate complex for analysis by mass spectrometry.

8. The process of claim 1, wherein the ligand is a monodentate ligand selected from chloride ion, bromide ion, fluoride ion, amide ion, cyanide ion, thiocyanate ion, pyridine and bipyridine.

9. The process of claim 1, wherein the action threshold value of the corrected total acid number is in the range from 0.01 mg/g to 5.0 mg/g.

10. The process of claim 1, wherein the action threshold value of the corrected total acid number is in the range from 0.1 mg/g to 1.0 mg/g.

11. The process of claim 1, wherein the action threshold value of the corrected total acid number is 1.0 mg/g.

12. The process of claim 1, wherein the chemical additive to the feed stock comprises at least one of a thiophosphate ester additive and a phosphate ester additive.

13. The process of claim 1, wherein the catalytic transforming of the feed stock comprises at least one of catalytic decarboxylation, catalytic hydrogenation, catalytic esterification, oxidation, thermal decomposition, alkaline neutralization, adsorption, solvent extraction, ionic liquid extraction, membrane filtration, coagulation and/or flocculation and biodegradation.

* * * * *